C. A. PFANSTIEHL.
TUNGSTEN REDUCING FURNACE.
APPLICATION FILED OCT. 15, 1915.
1,263,598.
Patented Apr. 23, 1918.
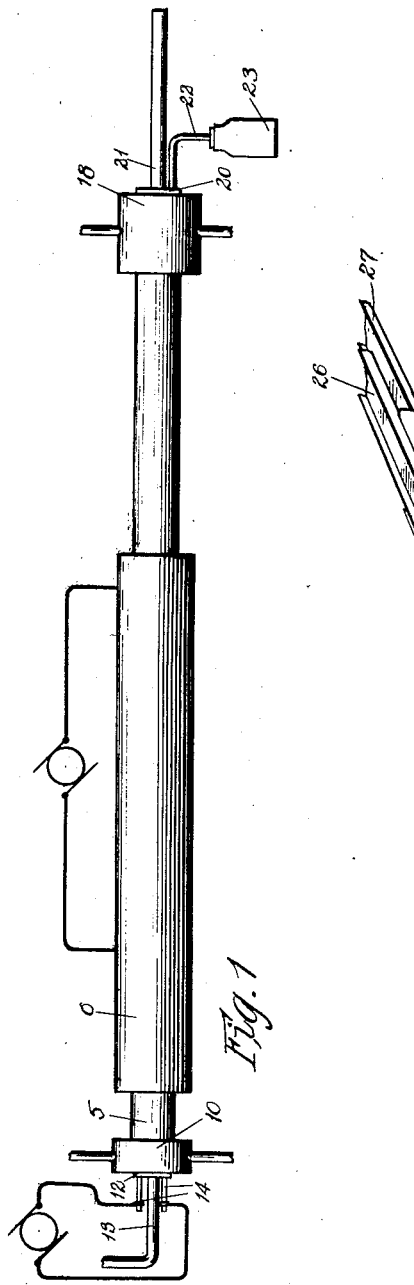
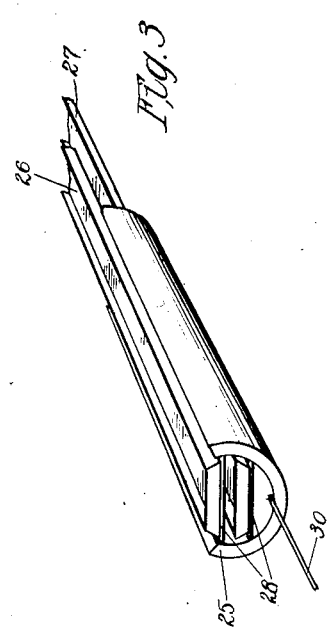
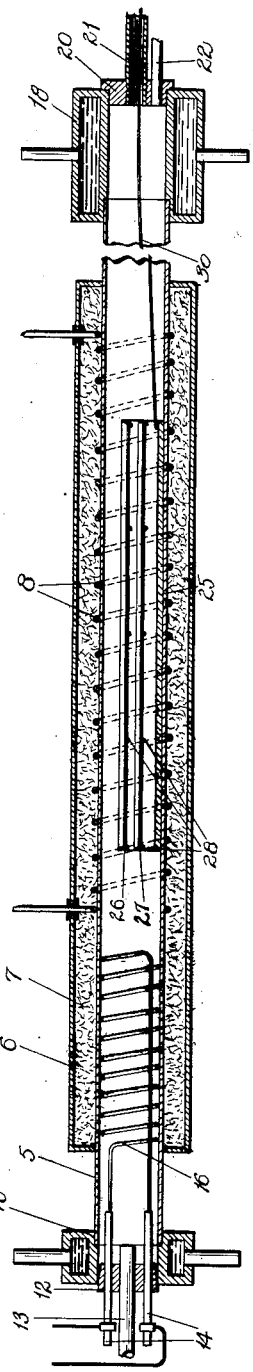
Witnesses:
Albin C. Ahlberg
H. A. Neiburger
Inventor
Carl A. Pfanstiehl
By Williams & Bradbury
Attorneys

UNITED STATES PATENT OFFICE.

CARL A. PFANSTIEHL, OF WAUKEGAN, ILLINOIS, ASSIGNOR TO PFANSTIEHL COMPANY, INC., OF NORTH CHICAGO, ILLINOIS, A CORPORATION OF NEW YORK.

TUNGSTEN-REDUCING FURNACE.

1,263,598.   Specification of Letters Patent.   Patented Apr. 23, 1918.

Application filed October 15, 1915. Serial No. 55,942.

*To all whom it may concern:*

Be it known that I, CARL A. PFANSTIEHL, a citizen of the United States, residing at Waukegan, in the county of Lake and State of Illinois, have invented a certain new and useful Improvement in Tungsten-Reducing Furnaces, (Case 15,) of which the following is a full, clear, concise, and exact description, reference being had to the accompanying drawings, forming a part of this specification.

My invention relates to reducing furnaces in which tungsten trioxid is reduced to metallic tungsten by the application of hydrogen in the presence of heat.

In order to produce malleable tungsten with little or no mechanical working of the metal after it has been fused into an ingot, it has been found to be important that the tungsten powder from which the tungsten ingot is formed be very fine and absolutely free from tungsten trioxid from which it is ordinarily formed.

In a co-pending application, Serial No. 872,952, I have described a method of producing tungsten trioxid in a very finely divided state and from which powdered tungsten satisfactory for the production of malleable tungsten may be secured. The present invention relates to an apparatus for reducing the tungsten trioxid to tungsten powder in a manner which insures the complete reduction in less time than it has been heretofore reduced and with the use of less hydrogen gas than has been heretofore found necessary.

It has been found important that the hydrogen gas brought into contact with the tungsten trioxid for reducing purposes be kept circulating over the surface of the tungsten trioxid with considerable velocity in order that the moisture created by the union of the hydrogen and the released oxygen be carried off before it has had an opportunity to form steam in the presence of the tungsten which has been already reduced. That is, heated tungsten trioxid is not as readily reduced to tungsten in the presence of moisture as when kept perfectly dry and the already reduced tungsten powder heated in the presence of moisture has a tendency to return to the state of a trioxid.

It has been found that by heating the hydrogen to a temperature substantially equal to that at which the tungsten trioxid which is being reduced is maintained, the released vapor will have less tendency for condensation and also that the tungsten trioxid which is first brought into contact with the fresh heated hydrogen will be reduced at substantially the same rate as that which lies at a greater distance from the point at which the fresh hydrogen is admitted to the furnace and which is attacked only by the hydrogen which has passed over other portions of the tungsten trioxid.

An object of my invention, therefore, is to provide an apparatus by which a greater quantity of tungsten trioxid may be satisfactorily reduced to powdered tungsten in less time than has been possible by apparatus of the same size and hydrogen capacity heretofore used.

My invention is illustrated in the accompanying drawings in which—

Figure 1 is an elevation of a furnace in which the external electrical connections are diagrammatically illustrated;

Fig. 2 is a section through Fig. 1 on a somewhat larger scale and with a portion of the refractory tube broken away; and Fig. 3 is a perspective of the nest of trays in which the tungsten trioxid is supported so as to be exposed to the passing hydrogen gas.

The preferred form of my invention herein illustrated comprises a main tube 5 of refractory material, such as silica or porcelain, this tube being in the commercial device about five feet long and two and one-half inches in diameter. Surrounding a portion of the tube 5 is a second metal tube 6, of larger diameter, the space between the two tubes being packed with magnesia, or other refractory sand, as indicated at 7. Encircling the tube 5 and in contact therewith throughout substantially two-thirds of the portion thereof inclosed by the tube 6 is a heating coil 8 of nichrome wire. The left end of the refractory tube 5 extends several inches beyond the end of the tube 6 and carries the metallic water jacket 10 having an opening therein of substantially the same bore as that of the tube 5. Into the outer end of this bore is fitted a stopper 12 through which a hydrogen intake tube 13 passes and through which also pass conducting bars 14 upon the inner ends of which the hydrogen heating nichrome coil 16 is supported, this coil being adapted to be withdrawn from the end of the tube with the removal of the stopper 12. The external ends of the conducting bars 14 are connected into a suitable electric circuit, as diagrammatically show in Fig. 1. The tube 5 extends for a distance of substantially two feet beyond the right end of the inclosing tube 6 and is not throughout this space provided with either heating or cooling means. The extreme right end of the tube 5, however, is provided with a metallic water jacket 18 similar in construction to the water jacket 10 at the left end of the tube 5, with the exception that the jacket 18 is provided with more extensive cooling surfaces. A stopper 20 is provided for the exposed end of the jacket 18 and through this the hydrogen exhaust tube 21 and the water drain 22 extend, the drain 22 being connected with a reservoir 23 into which the water formed by the chemical union of the released oxygen and the hydrogen collects, this water being condensed by the contact of the vapor with the cool water-jacketed member 18. Fig. 3 illustrates the boat 25 carrying a nest of trays 26 and 27 in which the tungsten trioxid is distributed for the reducing operation. These trays and the boat carrying them are preferably constructed of pure nickel, the boat being provided with nickel crossrods 28 for supporting the trays one above the other so that space is provided for the circulation of the hydrogen gas between the top of the tungsten trioxid and the base of the tray next above. Tungsten trioxid is also placed in the lower part of the boat 25 to a height somewhat less than the level of the base of the lower tray.

In operating my reducing furnace, the boat 25 and its accompanying trays are filled to the proper level with tungsten trioxid and the stopper 12 having been removed and the nickel or tungsten wire 30 having been attached to the boat 25 and threaded through the hydrogen exhaust 21, the boat with its contents is drawn into the position shown in Fig. 2. The stopper 12 is then replaced and both electric circuits are completed and the supply of hydrogen gas turned into the tube 13. The heating coils 16 and 8 gradually bring the temperature of the tube and the hydrogen contained therein up to that degree at which hydrogen attacks the tungsten trioxid, reducing it to pure tungsten. The hydrogen gas is kept in rapid circulation across the surface of the tungsten trioxid until all of the trioxid has been reduced to pure tungsten. During this operation a part of the water produced by the chemical union of the released oxygen and the hydrogen passes out through the tube 21 in the form of vapor, while the greater part thereof is condensed and conducted into the reservoir 23. The entire furnace is preferably mounted with the right end slightly lower than the left end so that moisture will naturally drain to the right end of the furnace. After the reducing operation is continued for that length of time necessary for complete reduction of the tungsten trioxid, the boat with its contents is drawn into that portion of the tube 5 which is not surrounded by the heat-retaining material 7 and tube 6 and is there allowed to stand until its temperature is reduced sufficiently that it may be exposed to the atmosphere without oxidation. During this period both electric circuits are interrupted and cool, dry hydrogen is permitted to pass over the tungsten to aid in quickly reducing its temperature. When the temperature has been finally reduced sufficiently, the plug 20 is removed and the boat 25 and its contents are withdrawn and refilled with tungsten trioxid for a second operation.

Although I have described my improvement with reference to details illustrated in the accompanying drawings, it is to be understood that modifications thereof may be made without departing from the spirit or scope of my invention.

What I claim as new and wish to secure by Letters Patent of the United States is:

1. A reducing furnace for tungsten trioxid comprising a tube, a heating element within said tube near one end thereof, a second heating element surrounding another portion of said tube, hydrogen injection means for injecting hydrogen into the tube at the end in which the first heating element is inserted and a tungsten carrier within the portion of the tube surrounded by the second heating element, a hydrogen exhaust means at the other end of the tube whereby the hydrogen gas is heated by direct contact with said first heating element before coming in contact with the heated tungsten trioxid.

2. A reducing furnace for tungsten trioxid comprising a long and slender tube, hydrogen injection means at one end of said tube and hydrogen exhaust means at the other end thereof, a coil of wire within the end of the tube adjacent the hydrogen injection means and means connecting said wire into an electric circuit for heating the wire, a movable carriage for tungsten trioxid in another part of said tube and means for heating the tube about said tungsten carriage, a third portion of said tube remote from the said heating elements and means for drawing the tungsten trioxid carriage into the latter portion of the tube for cooling purposes.

3. A carriage for supporting tungsten trioxid in a reducing furnace comprising a plurality of nickel trays arranged one above the other and supported so as to provide a passage for hydrogen between the trays.

4. A carriage for supporting tungsten trioxid in a reducing furnace comprising a main boat and a plurality of shelves or trays therein mounted one above the other so as to provide a hydrogen circulating space above the bottom of the main boat and beneath the lowest tray and a second space above the first tray and beneath the second tray.

5. In a reducing furnace the combination with a carriage for the material to be reduced, an electric heating element directly in contact with the reducing agent for heating the reducing agent to a temperature equal to that at which the material is maintained for reduction in advance of the contact of the gas with the material, and an additional electric heating element out of contact with the reducing agent for retaining the reducing agent and material to be reduced at constant temperature throughout the length of the reducing portion of the furnace.

In witness whereof, I hereunto subscribe my name this 1st day of October, A. D. 1915.

CARL A. PFANSTIEHL.

Witnesses:
 A. G. McCaleb,
 H. A. Neiburger.